Oct. 12, 1954 J. J. B. LAIR 2,691,727

IMPULSE STORING AND DISTRIBUTING CIRCUIT

Filed Nov. 2, 1949 2 Sheets-Sheet 1

INVENTOR
JULIEN J.B. LAIR
BY [signature]
AGENT

Oct. 12, 1954 J. J. B. LAIR 2,691,727

IMPULSE STORING AND DISTRIBUTING CIRCUIT

Filed Nov. 2, 1949 2 Sheets-Sheet 2

INVENTOR
JULIEN J. B. LAIR
BY R. J. Berry
AGENT

Patented Oct. 12, 1954 2,691,727

UNITED STATES PATENT OFFICE 2,691,727

IMPULSE STORING AND DISTRIBUTING CIRCUIT

Julien Jean Baptiste Lair, Nutley, N. J., assignor to International Standard Electric Corporation, New York, N. Y., a corporation of Delaware Application November 2, 1949, Serial No. 125,061

4 Claims. (Cl. 250—27)

Figure 1:
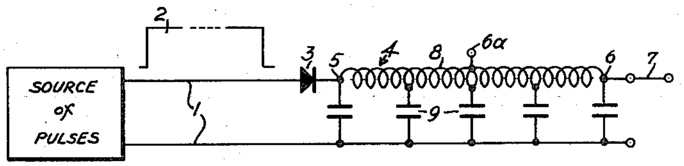

This invention relates to circuit arrangements for storing electrical impulses and for delaying their passage to another circuit for a controllable time period.

An object of the present invention is to provide a circuit arrangement for storing electrical impulses, which may be modulated in amplitude, for a controllable time, thus rendering it possible to distribute such pulses and others received from other similar pulse storing means to a common line in an order independent of the order in which they were received in their respective storing means.

According to one feature of the invention, the storing means consists of elements which do not dissipate the energy of the pulses, and which are capable of imparting a delay equal to one-half the duration of a pulse.

According to another feature of the invention, the storing device comprises an input circuit including a uni-lateral conducting device such as a rectifier and means in the output circuit for releasing the pulses at any desired time.

According to another feature of the invention, resistance is provided in the circuit of the storing means to eliminate fluctuations produced by noise.

Figures 2, 4, 5A, 5B:
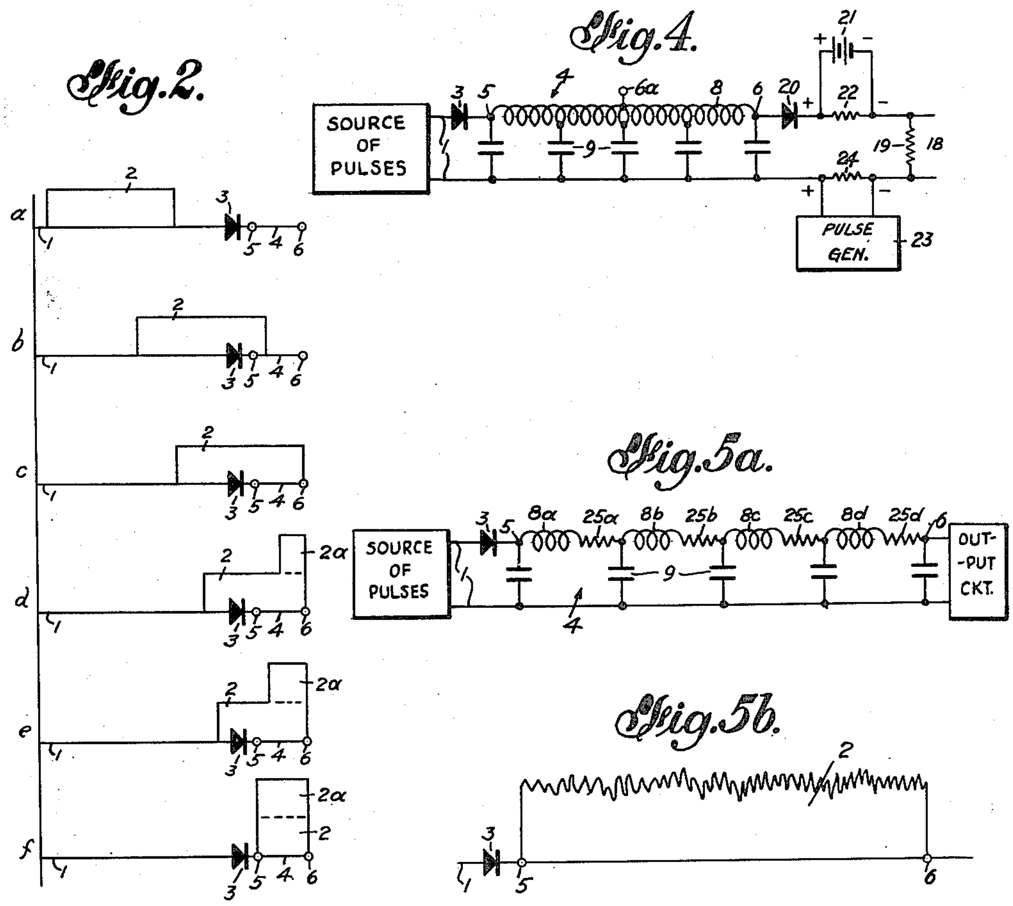
Figure 3:
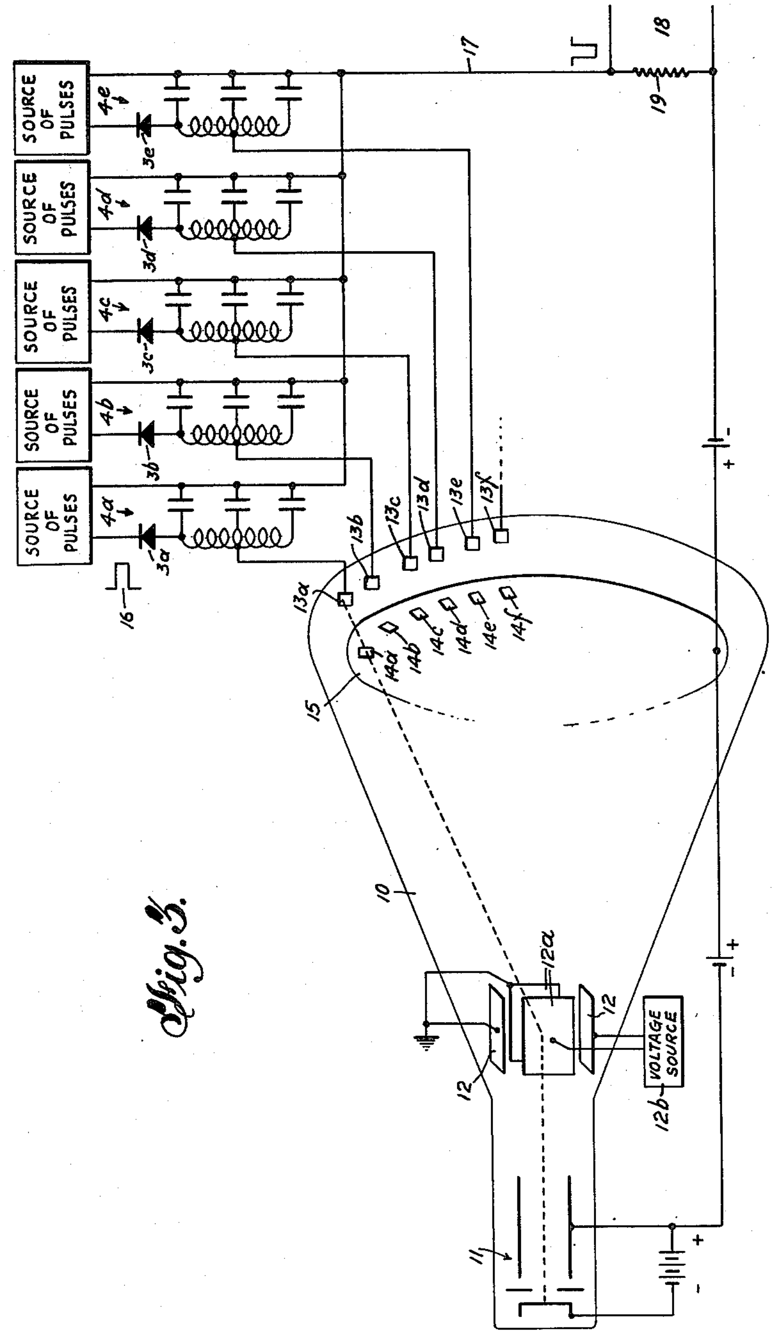

In the drawings:

Fig. 1 illustrates diagrammatically one embodiment of the invention;

Fig. 2 explains the operation of Fig. 1;

Fig. 3 diagrammatically illustrates an embodiment of the invention in combination with an electronic distributor of the so-called "Cyclophon" type;

Fig. 4 is a circuit diagram of an application of the invention in combination with means for generating pulses to release the stored pulses;

Figs. 5*a* and 5*b* diagrammatically illustrate an arrangement for attenuating fluctuations superimposed on the stored pulse.

Referring to Fig. 1, a positive pulse 2, impressed on line 1 will be admitted over unilateral conducting device such as a rectifier 3 into an artificial line or delay network 4 whose characteristic impedance looking into the line at point 5 is so chosen as to minimize reflection of pulses which pass rectifier 3.

The delay line 4 consists of non-dissipative elements comprising a plurality of series inductances 8 connected in one leg of the line, and a plurality of shunt capacitances 9. The electrical length of the line from point 5 to point 6 is one-half the length of a pulse 2 applied to the input 1. The pulse 2, to save space in the drawing, is shown partly in dotted line to indicate the fact that it is of greater width than illustrated. If the pulses applied to line 1 are negative, then the rectifier 3 must be oppositely poled from the one shown in the drawing. If line 4 terminates in an open circuit at its end 6, when the leading portion of the pulse arrives at end 6 it encounters an infinite impedance and is therefore reflected back along the line and in so doing is superimposed and added to the advancing and trailing portion.

In Fig. 2 I have shown at *a*, *b*, and *c* how a pulse travels over a line 1, past rectifier 3, into the delay line 4, until as shown in Fig. 2*c* it reaches the end 6 of the latter. In Fig. 2*d* is shown the start of reflection of the pulse which will cause the leading portion thereof, as is indicated at 2*a*, to travel back along the line so as to be superimposed on the trailing portion producing at the open end of the line a voltage having twice the amplitude as the original pulse. The reflected leading portion continues to travel back as the trailing portion advances as I have shown at *e*, Fig. 2 in which the superimposed portion 2*a* has grown in width by an amount equal to the reduction in width of the trailing portion. Finally as shown in Fig. 2*f* the leading one-half of the pulse 2*a* is superimposed on the trailing one-half and the pulse, reformed with one-half its former duration and twice its former amplitude, occupies the entire length of line 4, because, as stated above, the electrical length of line 4 is equal to one-half the length of the pulse. In the present application the intended meaning for the expression "electrical length" of line 4 is that physical length which may be computed as the product of the velocity of propagation along the delay line times one-half of the duration of a pulse. At the instant represented in Fig. 2*f*, equal voltages occur across line 4 at all points along its length, they being equal to twice the voltage of the original pulse 2. When the reflected pulse 2*a* reaches detector 3 it will encounter the back resistance thereof which may be considered for all practical purposes as an infinite impedance. It will be noted that this termination with respect to reflected energy corresponds to the open circuit encountered at point 6, by incident electrical energy. This will result in double reflection. Therefore, the leading portion of the reflected portion 2*a* will be reflected a second time so as to send it back in the incident direction toward line end 6. As this leading portion so reflected for the second time increases in its duration the trailing edge of portion 2*a* will continue to move toward line end 6. Therefore, the voltages along the line will continue to be equal at all points along it and the reformed pulse will persist on the delay line as a substantially square wave double in amplitude to the original pulse.

A device 7, Fig. 1, such as the electrode of an electron discharge device, may be connected with a point 6 of network 4 to serve as a means for releasing the stored pulse. One arrangement for doing this is illustrated in Fig. 3 in which, however, the stored pulse is withdrawn from line 1 over midpoint 6a (Fig. 1) of the network instead of its end point 6. In this figure there is shown a cathode ray tube 10 provided with an electron gun 11, pairs of deflecting plates 12 and 12a which are connected to a source 12b of two sinusoidal voltages having a 90° phase relationship, a plurality of dynodes 13a, b, c, etc. on which the beam of the tube may impinge through openings 14a, b, c, etc. of a metallic disk 15. The construction of such a tube is fully described in British Patent No. 603,614 (Lavin-Grieg 87–95). Each one of a number of delay lines 4a, b, c, d . . . n of the type shown in Fig. 1 is connected to a different one of the dynodes, the connection being to the mid point of the delay line corresponding to midpoint 6a of the delay line shown in Fig. 1. In the arrangements shown negative pulses are impressed on the delay line and accordingly rectifiers 3a, b, etc. of the delay lines are poled oppositely to rectifier 3 of Fig. 1 so as to permit the passage of negative pulses to the delay line rather than positive ones.

The action of the voltages provided by source 12b is to cause beam of tube 10 to be deflected so that its projection on metallic disk 15 moves along the circular path on which openings 14a, b . . . n are positioned so that the beam successively encounters them and passes through the disk to impinge on the dynodes 13a, b, etc.

The negative potential thus impressed on the delay line associated with the respective dynode will release the pulse stored in the delay network by reducing the potential of the point corresponding to 6 or 6a in Fig. 1, thus permitting the pulse to travel over the output conductor 17 to which all the delay lines are connected in multiple.

As the cathode ray passes over each of the dynodes it will complete a discharge path for the delay line connected with that dynode over a circuit including conductor 17 to which all of the delay lines are connected in multiple, resistance 19, the stream of electrons comprising the ray and the return path for free electrons normally provided in the cathode ray tube through circuits including the power supply thereof. Therefore, as the beam passes over each dynode it will discharge at least a portion of the negative pulse stored in the delay network connected thereto and will at the same time produce a pulse of voltage across the load resistor 19 and in the output circuit 18. As is well known if the discharging load circuit is properly matched to the delay line a substantially rectangular wave will appear in the output circuit which will have a duration determined by the constants of the discharge circuit.

By connecting the dynodes to intermediate points of the delay lines rather than to their terminal points it will be possible to reduce the duration of the discharge time, thereby reducing the duration of the released pulses. For this reason in Fig. 3 each dynode is shown connected to a mid-point in the respective delay line. This permits the halving of the internal impedance and halving the delay period whilst maintaining the same impulse energy. Thus by increasing the number of dynodes by providing two or more "Cyclophons" the beams of which are successively rotated in the same time, a different time period may be allocated to each signal channel.

It will be obvious from the above that the number of dynodes 13a, b . . . n determines the number of signal time channels on a common line.

In the arrangement shown in Fig. 4 the same delay network is illustrated as in Figs. 1 and 3. However, the releasing of the pulses into output circuit 18 across resistance 19 is controlled by an arrangement which includes instead of a cathode ray tube, a unilateral conducting device (rectifier 20) which is poled in the same direction as rectifier 3 and is connected between line 4 and resistance 19 in a series circuit including a source of direct potential and a source of pulses of such polarity as to oppose the direct potential. The series circuit offers an effective infinite impedance to the passage of a positive pulse stored in the network 4 because the source of direct potential, which includes a battery 21 and a resistor 22 in shunt to the battery and in series with rectifier 20, normally presents at the termination of line 4 a positive potential which is higher than the maximum potential that the pulse can attain within the delay network.

A source of pulses comprising pulse generator 23 and a resistance 24 which is in shunt to the generator output terminals and in series when the other elements of the series output circuit is arranged to apply square waves of opposite polarity to the potential applied by battery 21 and of the same or greater magnitude. Whenever generator 23 applies an impulse across resistance 24 making its left end positive with respect to its right end, this will transiently cancel the positive potential normally presented at the end of the termination of line 4 by the source of direct potential so that the impulse stored in network 4 will be released and will appear across the load resistance 19 of output circuit 17. Rectifier 20 is poled in the same direction as rectifier 3 so that it will not impede the release of the stored impulse at this time and so that it will nevertheless offer a high impedance to prevent any substantial current flow from battery 21 back into line 4.

The series circuit comprising rectifier 20, the source of potential 21, 22, resistance 19, output circuit 18 and the source of impulses, should preferably be designed so that its input impedance at the terminals by which it is connected to the delay line is the conjugate of the output impedance of the delay line point 6.

The discharging means i. e. the series circuit including rectifier 20, the source of potential, etc. may be connected on one of its sides to the midpoint 6a of line 4 instead of its terminal point 6. As has been explained in connection with the description of Fig. 3 this will permit a more rapid discharge of line 4 thus reducing the duration of the output pulse. Where an even more rapid discharge is desired a number of rectifiers may be used which are individually connected with points such as points 5, 6a and 6 on their one sides and connected together and to the positive side of resistor 22 on their other sides.

Fig. 5a illustrates a storage circuit similar to that of Fig. 1 having negligible loss but a finite conductance determined by the resistances 25a, 25b, 25c, 25d, interposed between the inductances 8.

Fig. 5*b* shows the position of an impulse 2 (the top of which is subjected to fluctuations). At the moment it is stored in the line 4 fluctuations impressed on the pulse 2 are not in equilibrium and are displaced to the right and left as they are reflected at each end of the line. The resistances 25*a*, etc. which may, of course, be constituted by the resistance of the inductance 8*a*, *b*, etc. dissipate during the repeated reflections of the impulse energy contained in these fluctuations.

What I claim is:

1. An electrical impulse storing and distributing system comprising a plurality of sources of electrical impulses, means for impressing a source of impulses on each of a plurality of storage circuits each comprising a delay line having a delay period not exceeding one-half the duration of the impulses impressed thereon from said sources and each comprising a unilateral conducting device connected between the delay line and the respective source of impulses, a common output circuit for all said storage circuits and means for releasing the impulses stored in said storage circuits into said common circuit in a predetermined order.

2. An electrical impulse storing and distributing system according to claim 1 in which said last-mentioned means comprises an electronic distributor including electron beam generating and deflecting means, a plate having a plurality of apertures positioned transversely of said beam, and a plurality of dynode electrodes located one behind each aperture, and a connection from each said dynode to one of said delay lines.

3. An electrical impulse storing and distributing system according to claim 1 in which said last-mentioned means comprises an electronic distributor including electron beam generating and deflecting means, a plate having a plurality of apertures positioned transversely of said beam, and a plurality of dynode electrodes located one behind each aperture, a connection from each said dynode to a point on one of said delay lines, and means for sweeping said beam sequentially across said dynodes at such rate that the repetition rate of the impulses in said common circuit is a multiple of the repetition rate of the impulses impressed on the inputs of said storage circuits.

4. An electrical impulse storing and distributing system according to claim 1 in which said last-mentioned means comprises an electronic distributor including electron beam generating and deflecting means, a plate having a plurality of apertures positioned transversely of said beam, and a plurality of dynode electrodes located one behind each aperture, a connection from each said dynode to an intermediate point on one of said delay lines whereby the released impulses have a shorter duration than the impulses impressed on the respective storage circuit.

References Cited in the file of this patent

UNITED STATES PATENTS

| Number | Name | Date |
|---|---|---|
| 2,164,520 | Henroteau | July 4, 1939 |
| 2,172,354 | Blumlein | Sept. 12, 1939 |
| 2,185,693 | Mertz | Jan. 2, 1940 |
| 2,219,021 | Riesz | Oct. 22, 1940 |
| 2,267,251 | Okolicsanyi | Dec. 23, 1941 |
| 2,405,069 | Tonks | July 30, 1946 |
| 2,413,391 | Usselman | Dec. 31, 1946 |
| 2,465,840 | Blumlein | Mar. 29, 1949 |
| 2,474,810 | Arditi et al. | July 5, 1949 |
| 2,474,811 | Arditi et al. | July 5, 1949 |
| 2,480,130 | Grieg | Aug. 30, 1949 |
| 2,492,346 | Arditi | Dec. 27, 1949 |
| 2,503,909 | Hollingsworth | Apr. 11, 1950 |
| 2,506,612 | Ransom | May 9, 1950 |
| 2,507,590 | Clark | May 16, 1950 |
| 2,602,158 | Carbrey | July 1, 1952 |